US012798313B2

(12) United States Patent
Chen

(10) Patent No.: US 12,798,313 B2
(45) Date of Patent: Nov. 17, 2026

(54) ELECTRIC TRACTOR

(71) Applicant: HUZHOU DAIXI ZHENHUA TECHNOLOGY TRADE CO., LTD., Huzhou (CN)

(72) Inventor: Xinhua Chen, Huzhou (CN)

(73) Assignee: HUZHOU DAIXI ZHENHUA TECHNOLOGY TRADE CO., LTD., Huzhou (CN)

( * ) Notice: Subject to any disclaimer, the term of this patent is extended or adjusted under 35 U.S.C. 154(b) by 254 days.

(21) Appl. No.: 18/675,191

(22) Filed: May 28, 2024

(65) Prior Publication Data

US 2025/0289278 A1 Sep. 18, 2025

(30) Foreign Application Priority Data

Mar. 15, 2024 (CN) ........................ 202420503822.0

(51) Int. Cl.

| | |
|---|---|
| ***B60K 1/00*** | (2006.01) |
| ***B60D 1/46*** | (2006.01) |
| ***B60D 1/52*** | (2006.01) |
| ***B60D 1/66*** | (2006.01) |
| *B60L 53/14* | (2019.01) |

(52) U.S. Cl.

CPC ............... *B60D 1/665* (2013.01); *B60D 1/46* (2013.01); *B60D 1/52* (2013.01); *B60L 53/14* (2019.02)

(58) Field of Classification Search

CPC .......... B60D 1/665; B60D 1/52; B60K 3/002; B60K 3/02; B60K 1/02

See application file for complete search history.

(56) References Cited

U.S. PATENT DOCUMENTS 3,166,141 A * 1/1965 Shields ................ B62D 51/005 180/21
2008/0076448 A1 * 3/2008 Bartkowski ........... H04W 64/00 455/456.1

* cited by examiner

*Primary Examiner* — Daniel V Venne
*Assistant Examiner* — James J Triggs
(74) *Attorney, Agent, or Firm* — Bayramoglu Law Offices LLC

(57) ABSTRACT

An electric tractor is provided. A front half segment of a frame is provided with a safety wheel. Each of two sides of the frame is provided with a traveling wheel. A rear end of the frame is provided with a guiding wheel. An adjustment unit is provided on the frame. The adjustment unit is configured to adjust a tractor head to move up and down. The electric tractor effectively improves the transportation efficiency, and can be used in different regions. The electric tractor can adjust the tractor head through the adjustment unit to move up and down, and select manual adjustment or electric adjustment on the frame according to an actual need, thus being convenient and efficient. By arranging the safety wheel, the electric tractor effectively solves the upward tiling problem of the handle unit.

19 Claims, 6 Drawing Sheets

ELECTRIC TRACTOR

CROSS REFERENCE TO THE RELATED APPLICATIONS

This application is based upon and claims priority to Chinese Patent Application No. 202420503822.0, filed on Mar. 15, 2024, the entire contents of which are incorporated herein by reference.

TECHNICAL FIELD

The present disclosure relates to a tractor, and in particular to an electric tractor.

BACKGROUND

A plurality of objects can be manually transported to one place, but with low efficiency and a large labor intensity. In view of this problem, a forklift can be used for transportation. This not only effectively improves the transportation efficiency, but also reduces the labor intensity of operators. However, the forklift has the shortcomings of a high manufacturing cost, a large size, a complex structure, a high operation difficulty, and a high maintenance cost. Meanwhile, for a narrow transportation area, the forklift is unavailable, and the manual transportation is still essential. Hence, the forklift cannot solve problems of the large labor intensity and the low transportation efficiency.

Therefore, those skilled in the art are committed to providing an electric tractor to effectively solve the above technical problems.

SUMMARY

In view of the above defects in the prior art, a technical problem to be solved by the present disclosure is to provide an electric tractor to effectively solve the above technical problems.

To achieve the above objective, the present disclosure provides an electric tractor, including a frame, where a front half segment of the frame is provided with a safety wheel; each of two sides of the frame is provided with a traveling wheel; a rear end of the frame is provided with a guiding wheel; and a lower end of the safety wheel is higher than the traveling wheel and the guiding wheel; and an adjustment unit is provided on the frame; the adjustment unit is configured to adjust a tractor head to move up and down, and locate the tractor head; and the rear end of the frame is provided with a handle unit.

Preferably, the adjustment unit includes a locating post; a lower end of the locating post is connected to the frame; a plurality of longitudinal locating holes are formed along a height direction of the locating post; a sliding sleeve is sleeved on the locating post; the sliding sleeve cooperates with the longitudinal locating hole through a latch to be located on the locating post; a front end of the sliding sleeve is provided with an extended seat; and the tractor head is detachably provided on the extended seat.

Preferably, the electric tractor further includes a transverse adjustment unit; the transverse adjustment unit includes a transverse adjustment rod provided on the frame; a plurality of transverse locating holes are formed along a length direction of the transverse adjustment rod; and the transverse adjustment rod may slide along a length direction of the frame, and is located on the frame through the transverse locating hole.

Preferably, the adjustment unit includes a guiding post connected to the frame; a guiding sleeve is slidably sleeved on the guiding post; the guiding sleeve is connected to an output end of an electric push rod; the electric push rod is provided on the frame; and the tractor head is provided at a front end of the guiding sleeve.

Preferably, a housing is provided on the frame; the front end of the guiding sleeve is provided with an extended segment; and the tractor head is detachably provided on the extended segment.

Preferably, a connecting sleeve is detachably provided at the output end of the electric push rod; an upper end of the connecting sleeve is connected to an upper end of the guiding sleeve; a middle segment of the connecting sleeve is connected to an outer wall of an upper half segment of the guiding sleeve through a reinforcing rod; the electric push rod is detachably connected to a lower end of a connector; an upper end of the connector is connected to a lower end of the frame; and a reinforcing plate is provided at a corner formed by the connector and the frame.

Preferably, the lower end of the frame is provided with a power unit, and the power unit is configured to drive the traveling wheel to rotate.

Preferably, the power unit is a motor; a power supply unit cooperating with the motor is provided on the frame; and a charging port is formed in an outer wall of the power supply unit.

Preferably, a front end of the frame is provided with a towing hook.

Preferably, the handle unit includes a first handle fixing rod; a lower end of the first handle fixing rod is connected to the frame, and an upper end of the first handle fixing rod is connected to a lower half segment of a second handle fixing rod in an adjustable manner through an angle fixing handle; an upper end of the second handle fixing rod is detachably connected to a handle through a handle fixing plate; and a brake handle and a forward-backward switch are provided on the handle.

The present disclosure has the following beneficial effects: The present disclosure effectively improves the transportation efficiency, and can be used in different regions. In addition, the present disclosure can adjust the tractor head through the adjustment unit to move up and down, and select manual adjustment or electric adjustment on the frame according to an actual need, thus being convenient and efficient. Furthermore, by arranging the safety wheel, the present disclosure effectively solves the upward tilting problem of the handle unit. Meanwhile, the present disclosure further has beneficial effects of a simple structure, a low manufacturing cost, convenience in use, hard damage, etc.

DETAILED DESCRIPTION OF THE EMBODIMENTS

The present disclosure will be further described in detail below in conjunction with the accompanying drawings and embodiments.

In the description of the present disclosure, it should be noted that the orientation or positional relationships indicated by the terms "upper", "lower", "left", "right", "vertical", "horizontal", "inside", "outside", etc. are based on the orientation or positional relationships shown in the accompanying drawings, are merely for facilitating the description of the present disclosure and simplifying the description, rather than indicating or implying that an apparatus or element referred to must have a particular orientation or be constructed and operated in a particular orientation, and therefore will not be interpreted as limiting the present disclosure. Moreover, the terms "first", "second", and "third" are used only for the purpose of description, and are not intended to indicate or imply relative importance.

In the description of the present disclosure, it should be noted that, unless otherwise clearly specified, meanings of terms "mount", "provide", and "connect" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two elements. Those of ordinary skill in the art may understand specific meanings of the foregoing terms in the present disclosure based on a specific situation.

Figure 1:
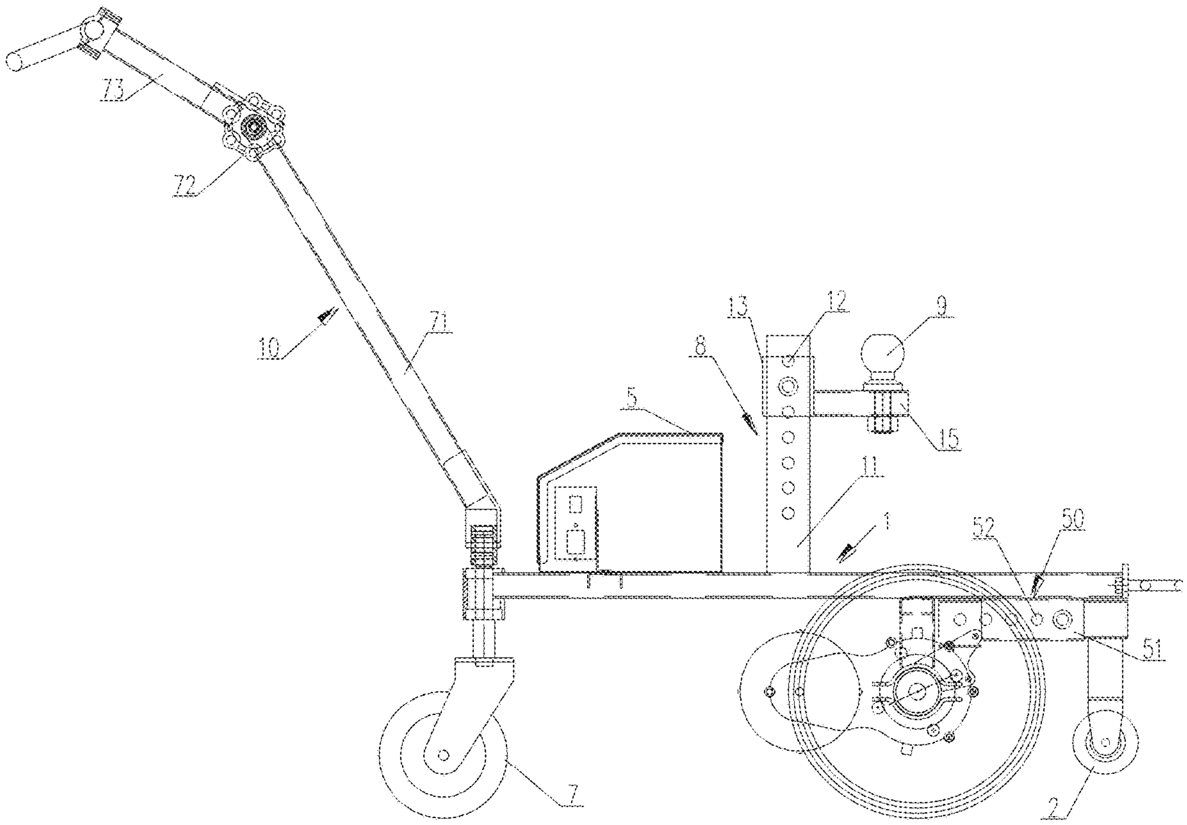
FIG. 1 is a structural view according to a first specific embodiment of the present disclosure.
Figure 2:
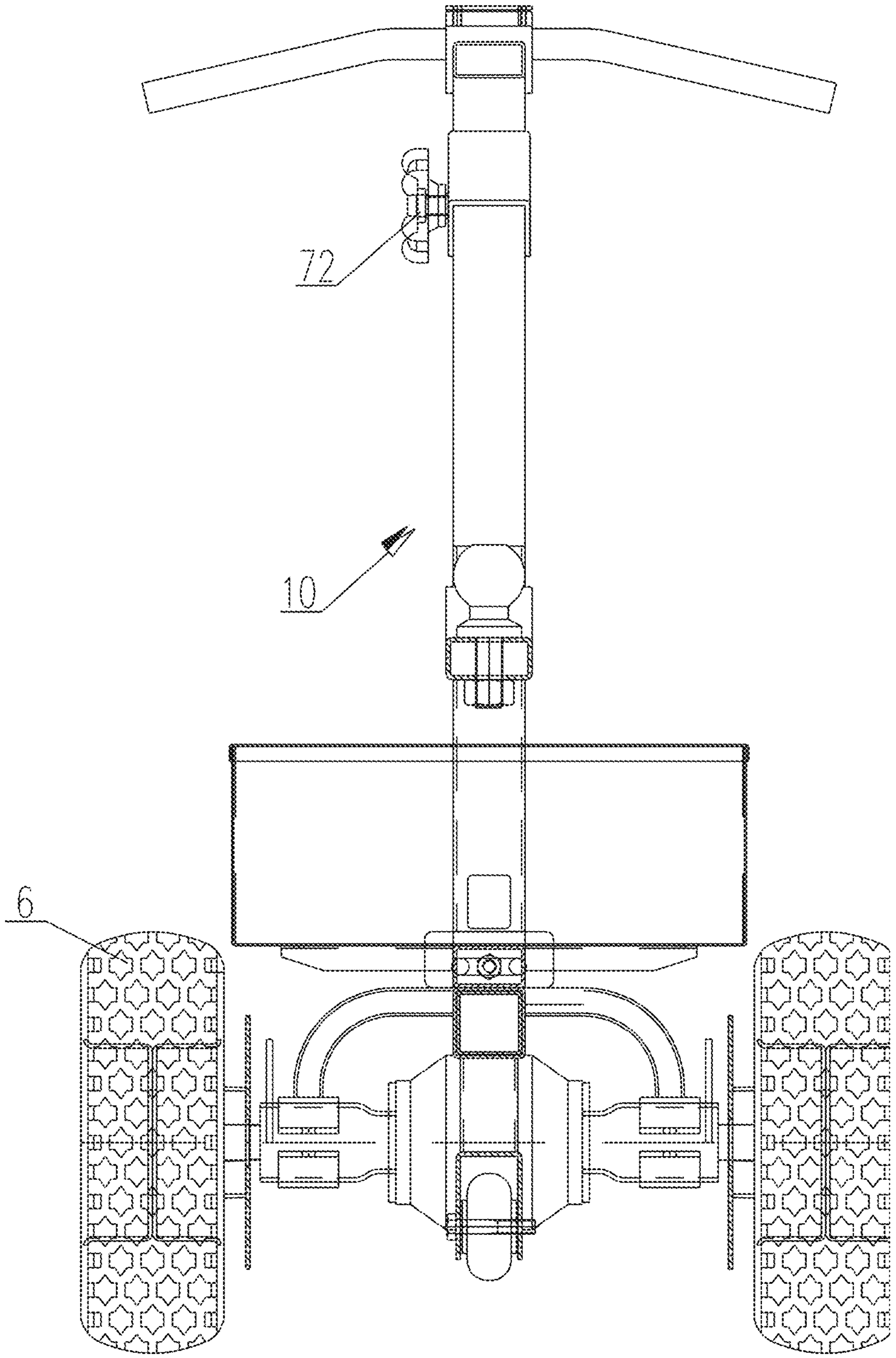
FIG. 2 is a left structural view of FIG. 1.
Figure 3:
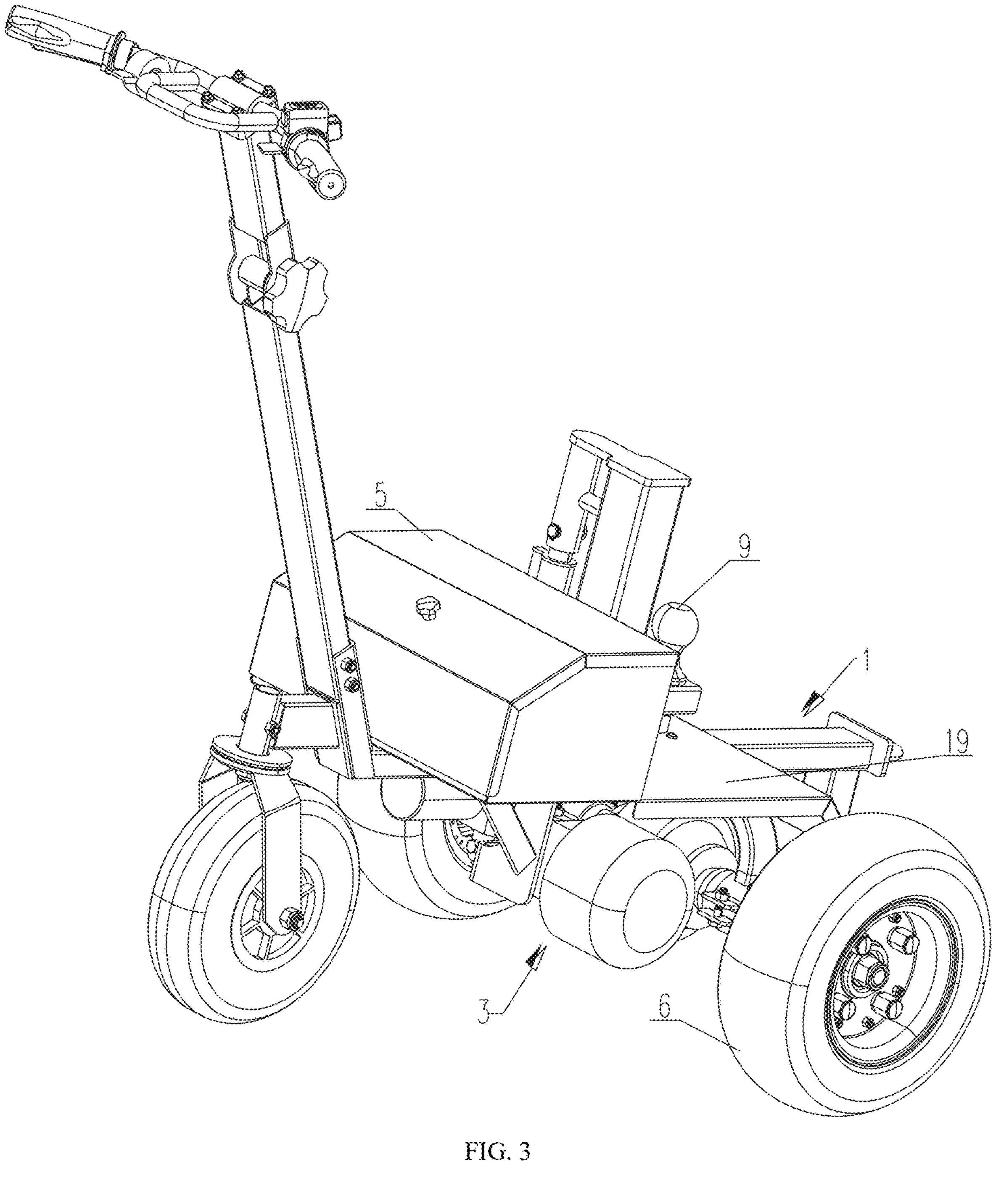
FIG. 3 is a first stereoscopic structural view according to a second specific embodiment of the present disclosure.
Figure 4:
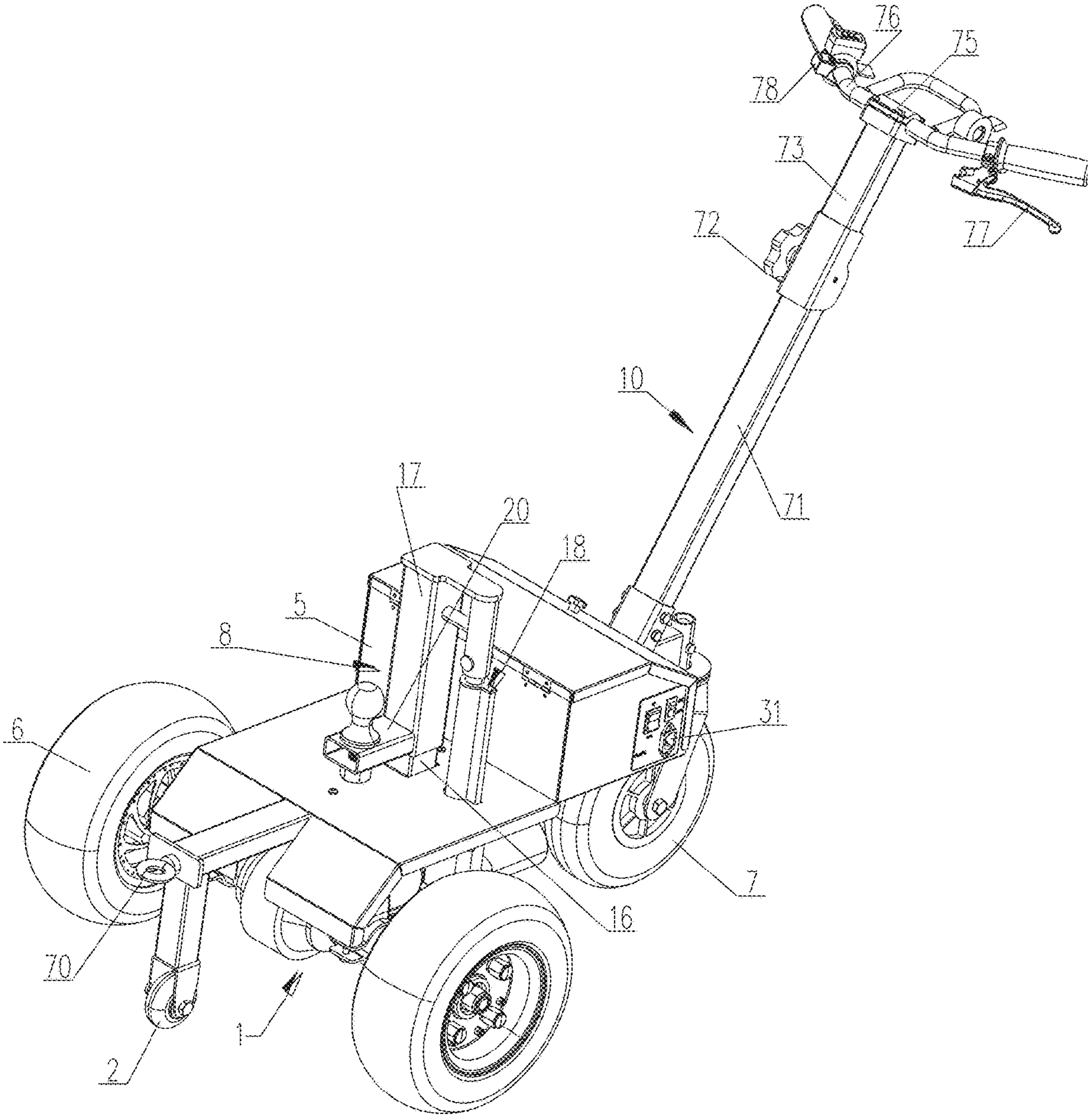
FIG. 4 is a second stereoscopic structural view in FIG. 3.
Figure 5:
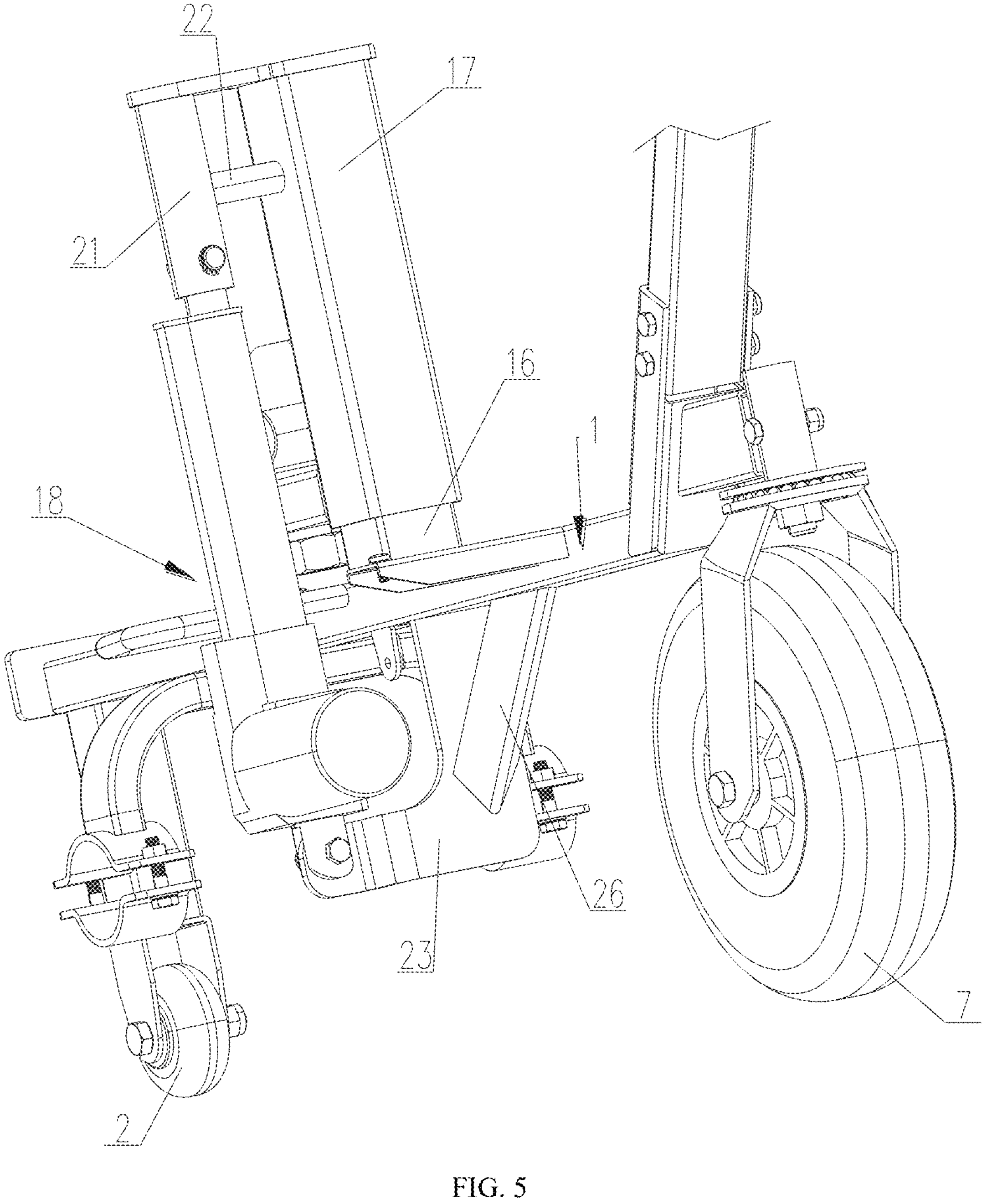
FIG. 5 is a structural view in which an electric push rod and other components are provided on a frame.
Figure 6:
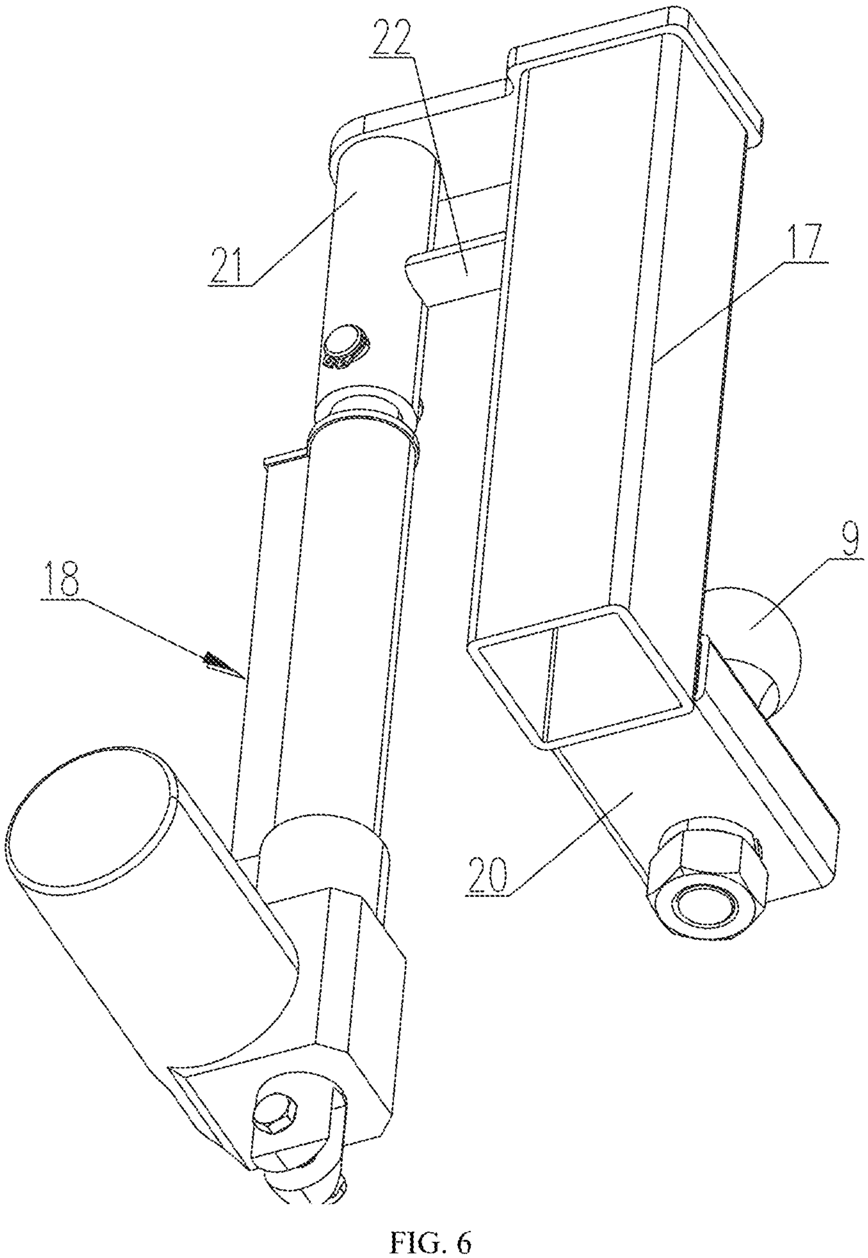
FIG. 6 schematically illustrates a connecting structure between an electric push rod and a guiding sleeve.

As shown in FIG. 1 to FIG. 6:

Embodiment 1

An electric tractor includes frame 1. A front half segment of the frame 1 is provided with safety wheel 2. Each of two sides of the frame 1 is provided with traveling wheel 6. A rear end of the frame 1 is provided with guiding wheel 7. A lower end of the safety wheel 2 is higher than the traveling wheel 6 and the guiding wheel 7. In the embodiment, the safety wheel 2 can effectively prevent a body of the tractor from tilting upward for a heavy object or an upslope. Specifically, handle unit 10 tilts upward for the upslope or the heavy object of the tractor. In view of this, the safety wheel 2 is provided. When the handle unit 10 tilts upward, the safety wheel 2 is landed to prevent the handle unit 10 from tilting upward continuously.

Adjustment unit 8 is provided on the frame 1. The adjustment unit 8 is configured to adjust tractor head 9 to move up and down, and locate the tractor head 9. The rear end of the frame 1 is provided with the handle unit 10.

The adjustment unit 8 includes locating post 11. A lower end of the locating post 11 is connected to the frame 1. A plurality of longitudinal locating holes 12 are formed along a height direction of the locating post 11. Sliding sleeve 13 is sleeved on the locating post 11. The sliding sleeve 13 cooperates with the longitudinal locating hole 12 through a latch to be located on the locating post 11. A front end of the sliding sleeve 13 is provided with extended seat 15. The tractor head 9 is detachably provided on the extension seat 15.

The electric tractor further includes transverse adjustment unit 50. The transverse adjustment unit 50 includes transverse adjustment rod 51 provided on the frame 1. A plurality of transverse locating holes 52 are formed along a length direction of the transverse adjustment rod 51. The transverse adjustment rod 51 may slide along a length direction of the frame 1, and is located on the frame 1 through the transverse locating hole 52.

The lower end of the frame 1 is provided with power unit 3. The power unit 3 is configured to drive the traveling wheel 6 to rotate. The power unit 3 is a motor. Power supply unit 5 cooperating with the motor is provided on the frame 1. Charging port 31 is formed in an outer wall of the power supply unit 5. A front end of the frame 1 is provided with towing hook 70. The handle unit 10 includes first handle fixing rod 71. A lower end of the first handle fixing rod 71 is connected to the frame 1, and an upper end of the first handle fixing rod 71 is connected to a lower half segment of second handle fixing rod 73 in an adjustable manner through angle fixing handle 72. An upper end of the second handle fixing rod 73 is detachably connected to handle 76 through handle fixing plate 75. Brake handle 77 and forward-backward switch 78 are provided on the handle 76. In the embodiment, on one hand, the sliding sleeve 13 can be moved up and down to cooperate with the longitudinal locating hole 12, thereby adjusting a height of the tractor head 9. In addition, a length of the transverse adjustment rod 51 can further be adjusted, such that the safety wheel 2 is collapsed and extended. For ease of storage, the safety wheel can also be collapsed when not used.

Embodiment 2

An electric tractor includes frame 1. A front half segment of the frame 1 is provided with safety wheel 2. A lower end of the safety wheel 2 is higher than traveling wheel 6 and guiding wheel 7. Each of two sides of the frame 1 is provided with the traveling wheel 6. A rear end of the frame 1 is provided with the guiding wheel 7. Adjustment unit 8 is provided on the frame 1. The adjustment unit 8 is configured to adjust tractor head 9 to move up and down, and locate the tractor head 9. The rear end of the frame 1 is provided with handle unit 10.

The adjustment unit 8 includes guiding post 16 connected to the frame 1. Guiding sleeve 17 is slidably sleeved on the guiding post 16. The guiding sleeve 17 is connected to an output end of electric push rod 18. The electric push rod 18 is provided on the frame 1. The tractor head 9 is provided at a front end of the guiding sleeve 17.

Housing 19 is provided on the frame 1. The front end of the guiding sleeve 17 is provided with extended segment 20. The tractor head 9 is detachably provided on the extended segment 20. Connecting sleeve 21 is detachably provided at the output end of the electric push rod 18. An upper end of the connecting sleeve 21 is connected to an upper end of the guiding sleeve 17. A middle segment of the connecting sleeve 21 is connected to an outer wall of an upper half segment of the guiding sleeve 17 through reinforcing rod 22. The electric push rod 18 is detachably connected to a lower end of connector 23. An upper end of the connector 23 is connected to a lower end of the frame 1. Reinforcing plate 26 is provided at a corner formed by the connector 23 and the frame 1. The lower end of the frame 1 is provided with power unit 3, and the power unit 3 is configured to drive the traveling wheel 6 to rotate. The power unit 3 is a motor. Power supply unit 5 cooperating with the motor is provided on the frame 1. Charging port 31 is formed in an outer wall of the power supply unit 5. A front end of the frame 1 is provided with towing hook 70. The handle unit 10 includes first handle fixing rod 71. A lower end of the first handle fixing rod 71 is connected to the frame 1, and an upper end of the first handle fixing rod 71 is connected to a lower half segment of second handle fixing rod 73 in an adjustable manner through angle fixing handle 72. An upper end of the second handle fixing rod 73 is detachably connected to handle 76 through handle fixing plate 75. Brake handle 77 and forward-backward switch 78 are provided on the handle 76. In the embodiment, the safety wheel 2 can effectively prevent a body of the tractor from tilting upward for a heavy object or an upslope. Specifically, the handle unit 10 tilts upward for the upslope or the heavy object of the tractor. In view of this, the safety wheel 2 is provided. When the handle unit 10 tilts upward, the safety wheel 2 is landed to prevent the handle unit 10 from tilting upward continuously.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the protection scope defined by the appended claims.

The invention claimed is:

1. An electric tractor, comprising a frame, wherein a front half segment of the frame is provided with a safety wheel; each of two sides of the frame is provided with a traveling wheel; a rear end of the frame is provided with a guiding wheel; and a lower end of the safety wheel is higher than the traveling wheel and the guiding wheel; and an adjustment unit is provided on the frame; the adjustment unit is configured to adjust a tractor head to move up and down, and locate the tractor head; and the rear end of the frame is provided with a handle unit, wherein the adjustment unit comprises a locating post; a lower end of the locating post is connected to the frame; a plurality of longitudinal locating holes are formed along a height direction of the locating post; a sliding sleeve is sleeved on the locating post; the sliding sleeve cooperates with a longitudinal locating hole of the plurality of longitudinal locating holes through a latch to be located on the locating post; a front end of the sliding sleeve is provided with an extended seat; and the tractor head is detachably provided on the extended seat.

2. The electric tractor according to claim 1, further comprising a transverse adjustment unit, wherein the transverse adjustment unit comprises a transverse adjustment rod provided on the frame; a plurality of transverse locating holes are formed along a length direction of the transverse adjustment rod; and the transverse adjustment rod is configured to slide along a length direction of the frame, and is located on the frame through a transverse locating hole of the plurality of transverse locating holes.

3. An electric tractor, comprising a frame, wherein a front half segment of the frame is provided with a safety wheel; each of two sides of the frame is provided with a traveling wheel; a rear end of the frame is provided with a guiding wheel; and a lower end of the safety wheel is higher than the traveling wheel and the guiding wheel; and an adjustment unit is provided on the frame; the adjustment unit is configured to adjust a tractor head to move up and down, and locate the tractor head; and the rear end of the frame is provided with a handle unit, wherein the adjustment unit comprises a guiding post connected to the frame; a guiding sleeve is slidably sleeved on the guiding post; the guiding sleeve is connected to an output end of an electric push rod; the electric push rod is provided on the frame; and the tractor head is provided at a front end of the guiding sleeve.

4. The electric tractor according to claim 3, wherein a housing is provided on the frame; the front end of the guiding sleeve is provided with an extended segment; and the tractor head is detachably provided on the extended segment.

5. The electric tractor according to claim 3, wherein a connecting sleeve is detachably provided at the output end of the electric push rod; an upper end of the connecting sleeve is connected to an upper end of the guiding sleeve; a middle segment of the connecting sleeve is connected to an outer wall of an upper half segment of the guiding sleeve through a reinforcing rod; the electric push rod is detachably connected to a lower end of a connector; an upper end of the connector is connected to a lower end of the frame; and a reinforcing plate is provided at a corner formed by the connector and the frame.

6. The electric tractor according to claim 1, wherein the lower end of the frame is provided with a power unit, and the power unit is configured to drive the traveling wheel to rotate.

7. The electric tractor according to claim 6, wherein the power unit is a motor; a power supply unit cooperating with the motor is provided on the frame; and a charging port is formed in an outer wall of the power supply unit.

8. The electric tractor according to claim 1, wherein a front end of the frame is provided with a towing hook.

9. The electric tractor according to claim 1, wherein the handle unit comprises a first handle fixing rod; a lower end of the first handle fixing rod is connected to the frame, and an upper end of the first handle fixing rod is connected to a lower half segment of a second handle fixing rod in an adjustable manner through an angle fixing handle; an upper end of the second handle fixing rod is detachably connected to a handle through a handle fixing plate; and a brake handle and a forward-backward switch are provided on the handle.

10. The electric tractor according to claim 1, wherein the lower end of the frame is provided with a power unit, and the power unit is configured to drive the traveling wheel to rotate.

11. The electric tractor according to claim 10, wherein the power unit is a motor; a power supply unit cooperating with the motor is provided on the frame; and a charging port is formed in an outer wall of the power supply unit.

12. The electric tractor according to claim 2, wherein the lower end of the frame is provided with a power unit, and the power unit is configured to drive the traveling wheel to rotate.

13. The electric tractor according to claim 12, wherein the power unit is a motor; a power supply unit cooperating with the motor is provided on the frame; and a charging port is formed in an outer wall of the power supply unit.

14. The electric tractor according to claim 3, wherein the lower end of the frame is provided with a power unit, and the power unit is configured to drive the traveling wheel to rotate.

15. The electric tractor according to claim 14, wherein the power unit is a motor; a power supply unit cooperating with the motor is provided on the frame; and a charging port is formed in an outer wall of the power supply unit.

16. The electric tractor according to claim 4, wherein the lower end of the frame is provided with a power unit, and the power unit is configured to drive the traveling wheel to rotate.

17. The electric tractor according to claim 16, wherein the power unit is a motor; a power supply unit cooperating with the motor is provided on the frame; and a charging port is formed in an outer wall of the power supply unit.

18. The electric tractor according to claim 5, wherein the lower end of the frame is provided with a power unit, and the power unit is configured to drive the traveling wheel to rotate.

19. The electric tractor according to claim 18, wherein the power unit is a motor; a power supply unit cooperating with the motor is provided on the frame; and a charging port is formed in an outer wall of the power supply unit.

* * * * *